(12) United States Patent
Kobayashi et al.

(10) Patent No.: US 7,030,532 B2
(45) Date of Patent: Apr. 18, 2006

(54) VARIABLE RELUCTANCE RESOLVER

(75) Inventors: Masahiro Kobayashi, Tokyo (JP); Hiroyuki Kujirai, Tokyo (JP); Takanobu Koyama, Tokyo (JP); Nao Aoki, Tokyo (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 10/821,910

(22) Filed: Apr. 12, 2004

(65) Prior Publication Data

US 2005/0023921 A1 Feb. 3, 2005

(30) Foreign Application Priority Data

Jul. 28, 2003 (JP) .............................. 2003-280558

(51) Int. Cl.
*H02K 17/42* (2006.01)

(52) U.S. Cl. ...................... 310/168; 310/269; 310/68 B

(58) Field of Classification Search ........ 310/166–168, 310/261, 269, 68 B
See application file for complete search history.

(56) References Cited

U.S. PATENT DOCUMENTS

| | | | |
|---|---|---|---|
| 2,805,677 A * | 9/1957 | Baird | 324/207.18 |
| 3,514,650 A * | 5/1970 | Caywood, Jr. | 310/168 |
| 4,186,316 A * | 1/1980 | Singh | 310/49 R |
| 4,631,510 A * | 12/1986 | Nagarkatti et al. | 336/135 |
| 4,743,786 A | 5/1988 | Ichikawa et al. | 310/111 |
| 5,300,884 A * | 4/1994 | Maestre | 324/207.25 |
| 5,418,415 A * | 5/1995 | Ishizaki | 310/162 |
| 5,446,966 A | 9/1995 | Ishizaki et al. | 33/1 PT |
| 5,559,386 A * | 9/1996 | Gurrieri | 310/211 |
| 5,763,976 A * | 6/1998 | Huard | 310/168 |
| 6,433,536 B1 * | 8/2002 | Yundt et al. | 324/207.22 |
| 6,784,582 B1 * | 8/2004 | Kolomeitsev et al. | 310/156.38 |
| 6,891,365 B1 * | 5/2005 | Nakano et al. | 324/207.25 |

FOREIGN PATENT DOCUMENTS

| | | |
|---|---|---|
| EP | 1321744 | 6/2003 |
| JP | 11-118416 | 4/1999 |
| JP | 11-313470 | 11/1999 |
| JP | 2000-105133 | 4/2000 |

* cited by examiner

*Primary Examiner*—Dang Le
(74) *Attorney, Agent, or Firm*—Bacon & Thomas, PLLC

(57) ABSTRACT

A variable reluctance resolver has a rotor which includes a noncircular core and which is rotatably supported inside a stator with a gap therebetween. The shape of the rotor is such that the gap permeance, which is based on the gap, varies according to a sine function of the rotational angle. Each of the salient poles of the rotor has an outer periphery comprising an arc of radius r centered on a point which is offset from the center of the rotor by a prescribed offset distance. The outer periphery of each salient pole does not extend to the inner periphery of the stator.

5 Claims, 2 Drawing Sheets

VARIABLE RELUCTANCE RESOLVER

BACKGROUND OF THE INVENTION

1. Field of the Invention

The present invention relates to a variable reluctance (VR) resolver, and in particular to a VR resolver which has a rotor which is shaped such that the gap permeance varies according to the sine of the rotational angle, which is expressed by the mechanical angle φ or the electrical angle θ corrected by a shaft angle multiplier (shaft angle multiplication factor).

2. Related Art

In the past, the shape of a rotor in a VR resolver was formed as described below in (1)–(3).

(1) In the case of a VR resolver whose rotor has no winding and which utilizes variations in reluctance at a gap, when the rotor is shaped to have a property such that the gap permeance varies in accordance with the sine of the rotational angle (referred to below as a "sinusoidally varying property"), the rotor has a simple structure of an iron core without windings, and a sinusoidal voltage with a period corresponding to the shape of the salient poles of the rotor is output by the output windings. When the inner periphery of the stator is a perfect circle, the length re between the outer periphery and the center of the rotor at an angle θ is determined by the following Equation 1.

$$r_\theta = r_1 - \frac{\delta_0}{1 + \left(\frac{\delta_0}{\delta_1} - 1\right)\cos n\theta} \quad \text{Eq. 1}$$

Here, $r_1$ is the radius of the inner periphery of the stator, $\delta_0$ is the gap between the stator and the rotor at 90° and 270°, $\delta_1$ is the gap between the stator and the rotor at 0°, and n is the shaft angle multiplier.

The angular error of a 4× resolver fabricated on the basis of the above Equation 1 and having a stator inner diameter of 46.4 mm is shown as the conventional example in the following Table 1 and in FIG. 2B. Table 1 shows the angular error sampled every 30°.

FIGS. 2A and 2B are graphs showing the measured angular error of a VR resolver with a shaft angle multiplier of 4× according to an embodiment of the present invention, and that of a conventional VR resolver with a shaft angle multiplier of 4×. FIG. 2B is a graph of the measured angular error of a conventional VR resolver with a shaft angle multiplier of 4× and a stator inner diameter of 46.4 mm.

Here, the "angular error" means the difference between the mechanical angle when the resolver is made to rotate and the electrical angle of the resolver output signal resulting from the rotation. The angular error=mechanical angle−(electrical angle/shaft angle multiplier).

The "error" is expressed in minutes (1/60 of a degree).

If the shaft angle multiplier is 1×, then n=1 in Equation 1, and the rotor becomes heart shaped.

A controller (not shown) comprising a microcomputer is employed in order to measure the angular error. At the time of measurement, the controller fetches the output signal of a sensor which senses the mechanical rotational angle of the rotor, the output signal of the output winding of the stator, and the like; performs necessary calculations; and determines at least the angular error at every angle and outputs the error.

In the following Table 1, "This invention" indicates the angular error properties of a below-described embodiment of the present invention.

TABLE 1

| | Angular Error (minutes) | |
|---|---|---|
| Angle (°) | Conventional Example | Present Invention |
| 0 | 0 | 0 |
| 30 | 13.8 | −1.5 |
| 60 | −3.1 | −3 |
| 90 | −1.8 | 0 |
| 120 | 13.8 | −1.5 |
| 150 | −3.1 | −3 |
| 180 | 0 | 0 |
| 210 | 13.8 | −1.5 |
| 240 | −3.1 | −3 |
| 270 | −1.5 | 0 |
| 300 | 13.8 | −1.5 |
| 330 | −3.1 | −3 |
| 360 | −4.6 | 0 |

As shown by the conventional example in the above Table 1, the angular error for a conventional rotor, i.e., the angular error of a conventional VR resolver [=mechanical shaft angle (mechanical angle φ)−electrical shaft angle (electrical angle θ/shaft angle multiplier N)] is large, and at an angle of 30°, 120°, 210°, and 300°, a large error 13.8 minutes occurs.

(2) A conventional VR resolver was constructed as described above, so it had the following problems. Equation 1 is based on a model which assumes that magnetic flux passes in a straight line in the gap towards the center of the rotor, so it does not describe an actual rotor. Namely, in regions where the gap width is large and there are large variations in the magnetic field, the magnetic flux is curved, so a leakage flux is formed at, for example, the end surfaces of the salient poles of the rotor. Therefore, a harmonic error component other than a first order error component, and typically a third order error component, is added to the output signal corresponding to the angle of the resolver.

In light of this problem, in the past, the following Equation 2 has been proposed to remove this error component.

$$\delta_\theta = \frac{\delta_0}{1 + \left(\frac{\delta_0}{\delta_1} - 1\right)\cos n\theta} + K(1 - \cos 2\theta) \quad \text{Eq. 2}$$

Here, $\delta_\theta$ is the gap between the stator and the rotor at a rotational angle θ, $\delta_0$ is the gap between the stator and the rotor at 90° and 270°, $\delta_1$ is the gap between the stator and the rotor at 0°, n is the shaft angle multiplier, and K is a constant.

Equation 2 is Equation 1 to which the correction term K(1−cos 2θ) has been added. Namely, a simulation is carried out such that an output signal which includes an error component, which is the difference between an actually measured output voltage and a theoretical value, becomes a signal including a corrected signal which corrects the error component and a reversed error component which is the error component with its sign reversed, and the value of K in the correction term is determined. The value of the constant K varies in accordance with the correction amount in the simulation.

In this case, the error component has its sign reversed and then it is added to the measured value, so the error component is corrected (see, for example, Patent Document 1).

(3) When the induced voltage in the output windings is not a pure sine wave but includes a harmonic component, there are cases in which the following Equation 3 is used to define the shape of salient poles which minimize these harmonic components.

$$R_{\theta 2} = R_1 - \frac{k\delta_1}{1+(k-1)\cos(N\theta_2)} \qquad \text{Eq. 3}$$

Here, $R_{\theta 2}$ is the distance between the outer periphery and the center of the rotor core at a spatial angle $\theta_2$, $R_1$ is the inner radius of the stator core, $\delta_1$ is the minimum gap length, and N is the number of salient poles on the core.

In this example, the rotor shape is selected such that when the center of a salient pole serves as the origin and the spatial angle which indicates the position on the outer periphery of the rotor is represented by $\theta_2$, the variation in the gap permeance by the salient poles is $\cos(N\theta_2)$ (see, for example, Patent Documents 2 and 3).

Patent Document 1: Japanese Patent Application Laid-Open (kokai) No. Hei 11-118416.

Patent Document 2: Japanese Patent Application Laid-Open (kokai) No. Hei 11-313470.

Patent Document 3: Japanese Patent Application Laid-Open (kokai) No. 2000-105133.

Various conceivable parameters, such as the number of salient poles, stator windings, or curved flux which excludes flux extending in a straight line in the radial direction in a gap, can be used to correct the gap permeance, which is the inverse of the gap between the stator and the rotor, so as to vary sinusoidally.

In the conventional method of correction described above as example (2) of the background art in which the error component is reversed in sign and added to the measured value, the reason why $K(1-\cos 2\theta)$ is added as a correction term is not disclosed and is unclear, and only correction which varies with two times the rotational angle $\theta$ is at all possible. Furthermore, the value of the constant K in the correction term varies in accordance with the amount of correction in a simulation, and as a result, there is no great difference from the conventional correction method in which correction is carried out by simulation.

In light of these circumstances, the conventional methods can not be said to properly cancel harmonic components other than a first order component, and typically a third order harmonic error component, contained in the output signal.

Above-described example (3) of the background art forms the shape of the salient poles in accordance with above-described Equation 3, but the effect of harmonics still remains, and problems remain with respect to its practical application.

SUMMARY OF THE INVENTION

In light of the above-described problems, the object of the present invention is to provide a variable reluctance resolver having a rotor shape such that the gap permeance varies in accordance with a sine function of the rotational angle.

In a rotor having a shape formed by the above-described conventional equations, the shape of the salient poles is defined using the center of the rotor as a reference.

As the shaft angle multiplier becomes greater than 1× such as 2×, 4×, etc. as the number of poles increases, the angular range in which the rotor exhibits a sinusoidally varying property in relation to the gap permeance decreases. As the angular range decreases in this manner, the angular range of a single salient pole similarly decreases. As a result, the shape of the outer periphery of a salient pole can be made to closely match an arc of radius r. However, the center of the arc and the center of the rotor deviate from one another. The present inventors discovered that when an arc of a radius r optimally matched to the outer peripheral shape of each salient pole is used as a reference, and the distance between the center of the arc and the center of the rotor is set as an offset distance, the shape of the rotor can be designed in such a manner that the gap permeance exhibits the sinusoidally varying property. It was confirmed that even when the above design is applied to a VR resolver having a small number of salient poles, the gap permeance vary sinusoidally with high accuracy.

This invention was made in order to achieve the above-described object, and it employs the following means for solving the problem based on the above-described knowledge.

(1) A variable reluctance resolver has a rotor which comprises a noncircular core and which is rotatably supported inside a stator with a gap therebetween. The shape of the rotor is such that the gap permeance, which is based on the gap, varies according to a sine function of the rotational angle. Each salient pole of the rotor has a center which is offset by a prescribed offset distance in the radial direction from the center of the rotor, and the outer peripheral shape of each salient pole comprises an arc of a circle of radius r which is centered on the center of the salient pole and does not extend to the inner peripheral surface of the stator.

(2) In the variable reluctance resolver described above in (1), the shape of the rotor is defined in accordance with the rotational angle, which is expressed by the mechanical angle $\phi$ or the electrical angle $\theta$ corrected by the shaft angle multiplier, and the offset distance A such that the outer radius Rr of the rotor has a value given by the following Equation 4.

$$Rr = A\cos\phi + \sqrt{r^2 - A^2\sin^2\phi} = A\cos(\theta/N) + \sqrt{r^2 - A^2\sin^2(\theta/N)} \qquad \text{Eq. 4}$$

wherein r is the radius of each salient pole, A is the offset distance, $\phi$ is the mechanical angle ($\phi$=electrical angle $\theta$/shaft angle multiplier N), $\theta$ is the electrical angle, and N is the shaft angle multiplier.

(3) In a variable reluctance resolver as described above in (1) or (2), the shape of the rotor is defined in accordance with the rotational angle, which is expressed by the mechanical angle $\phi$ or the electrical angle $\theta$ corrected by the shaft angle multiplier, such that the gap $\delta$ between the stator and the rotor has a value given by the following Equation 5.

$$\delta = R_s - A\cos\phi - \sqrt{r^2 - A^2\sin^2\phi} = R_s - A\cos(\theta/N) - \sqrt{r^2 - A^2\sin^2(\theta/N)} \qquad \text{Eq. 5}$$

wherein $\delta$ is the gap, Rs is the inner radius of the stator, A is the offset distance, $\phi$ is the mechanical angle ($\phi$=electrical angle θ/shaft angle multiplier N), θ is the electrical angle, N is the shaft angle multiplier, and r is the radius of the salient poles.

The present invention provides the following effects.

(1) The shape of the rotor is basically determined by an offset distance and an arc of radius r, so by optimizing the offset distance, the gap permeance between the rotor and the stator can be made to have a property extremely close to the sinusoidally varying property.

(2) In the formula for the law of cosines in Equation 4, by optimally setting the offset distance and the radius r, a rotor shape can be obtained which forms a gap with gap properties which are extremely close to desired gap permeance properties.

(3) By defining the gap based on the inner radius of the stator and the rotor radius as in (2) above, the gap permeance between the stator and the rotor can be made to approach extremely close to properties which vary according to a sine function of the rotational angle.

The gap between the stator and the rotor is found by a simulation based on Equation 5, so the gap permeance of the gap can be made to approach extremely close to properties which vary according to a sine function of the rotational angle, and output properties are improved.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

An embodiment of the present invention will be described while referring to the accompany drawings.

A manufacturing method for a rotor in which a gap between the rotor and a stator is such that the difference between a measured value and a theoretical value approaches extremely close to zero and a rotor shape formed using this method will be described.

Figure 1:
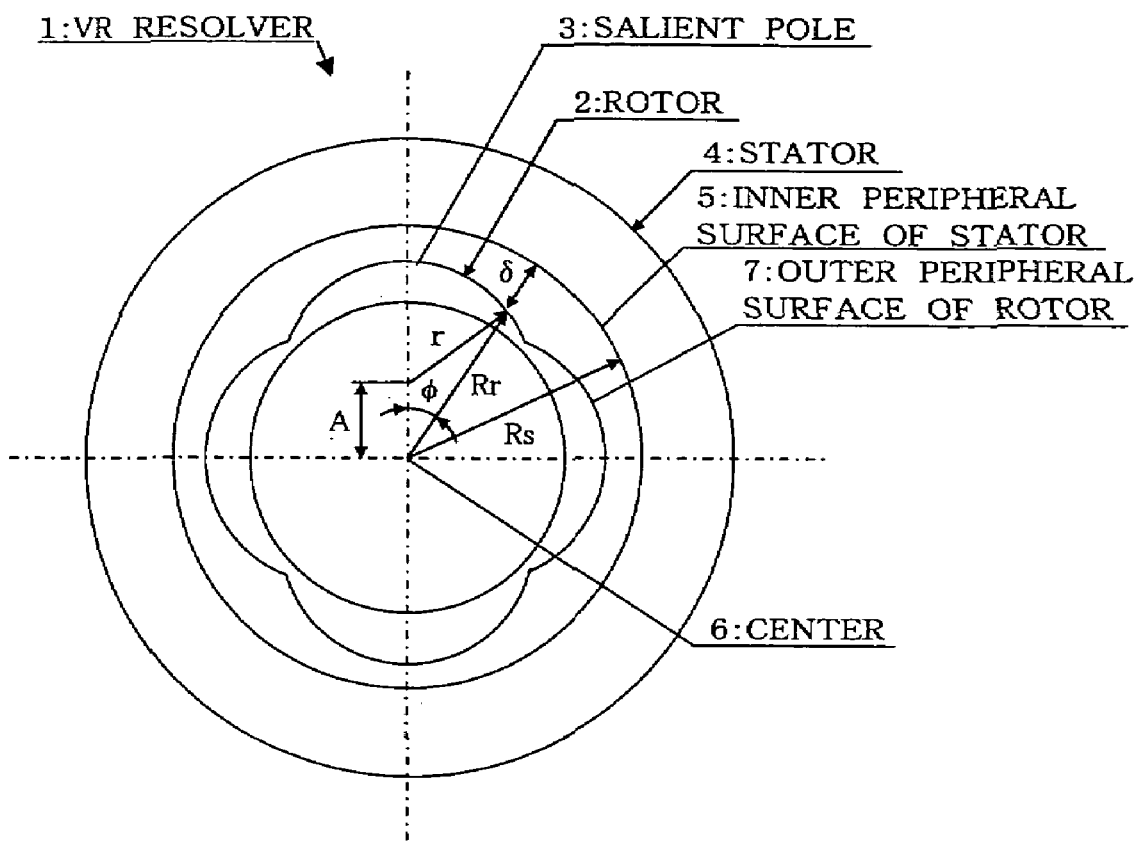
FIG. 1 is a schematic view of a VR resolver according to the present invention, showing the case in which the value of the gap between the rotor and the stator, which determines the rotor shape, is found by Equation 4.

FIG. 1 shows an embodiment of a VR resolver 1 according to the present invention. It shows an example in which the shape of a magnetic rotor is determined by the above-described Equation 4, and in which the value of the gap δ between the rotor 2 and the stator 4, which determines the shape for the rotor 2, is determined by the above-described Equation 5. FIG. 1 shows the case in which the shaft angle multiplier N=4, i.e., the case in which the rotor 2 has four abutting salient poles 3 protruding from and evenly spaced around the periphery of a central circular portion.

In FIG. 1, δ is the gap measured in the radial direction between the inner peripheral surface 5 of the stator 4 and the outer peripheral surface 7 of the rotor 2, Rr is the outer radius measured from the center 6 of the rotor 2 to its outer peripheral surface 7 at an angle (mechanical angle) φ, Rs is the inner radius measured from the center 6 of the rotor 2 to the stator inner peripheral surface 5 at an angle (mechanical angle) φ, φ is the mechanical angle, A is the offset distance (length), N is the shaft angle multiplier, and θ is the electrical angle. If N (shaft angle multiplier)× φ (mechanical angle)=θ (electrical angle), then from the law of cosines, the outer radius Rr of the rotor 2 is found from the following equation.

$$r^2 = A^2 + Rr^2 - 2ARr\cos\phi \qquad \text{Eq. 6}$$

$$Rr = A\cos\phi + \sqrt{r^2 - A^2\sin^2\phi}$$

$$= A\cos(\theta/N) + \sqrt{r^2 - A^2\sin^2(\theta/N)}$$

If the inner radius of the stator is Rs, then the gap δ between the rotor 2 and the stator 4 is given by the following equation.

$$\delta = Rs - Rr \qquad \text{Eq. 7}$$

$$= Rs - A\cos\phi - \sqrt{r^2 - A^2\sin^2\phi}$$

$$= Rs - A\cos(\theta/N) - \sqrt{r^2 - A^2\sin^2(\theta/N)}$$

This gap δ is set such that the gap permeance varies as a sine function of the rotational angle (φ=θ/N) expressed by the mechanical angle φ or the electrical angle θ corrected by the shaft angle multiplier. In other words, in this case, the offset distance A is set by a simulation so that the output voltage becomes an ideal output voltage which varies in the shape of a sine wave.

φ is in the range of −180/N ≦ φ ≦ 180/N, so the rotor 2 has a repeating shape. The number of salient poles N is set to a desired value.

In the present invention, the optimal offset distance is the optimal value when the gap permeance varies according to a sine function. However, the optimal value in actual practice refers to a range in which the gap permeance varies according to a sine function and in which there are no problems in actual use.

(Results of Measurement)

The angular error characteristics of a 4× resolver with a stator inner diameter of 34 mm prepared based on the above Equations 6 and 7 are shown in the column for this invention in the above Table 1 and in FIG. 2A.

FIG. 2A is a graph of the measured angular error of a VR resolver according to the present invention with a shaft angle multiplier of 4× and a stator inner diameter of 34 mm.

Table 1 shows the angular error sampled every 30°. Except where the error is a maximum of −3 minutes at the sampling points 60°, 150°, 240°, and 330°, the angular error is substantially 0 minutes.

Figure 2:
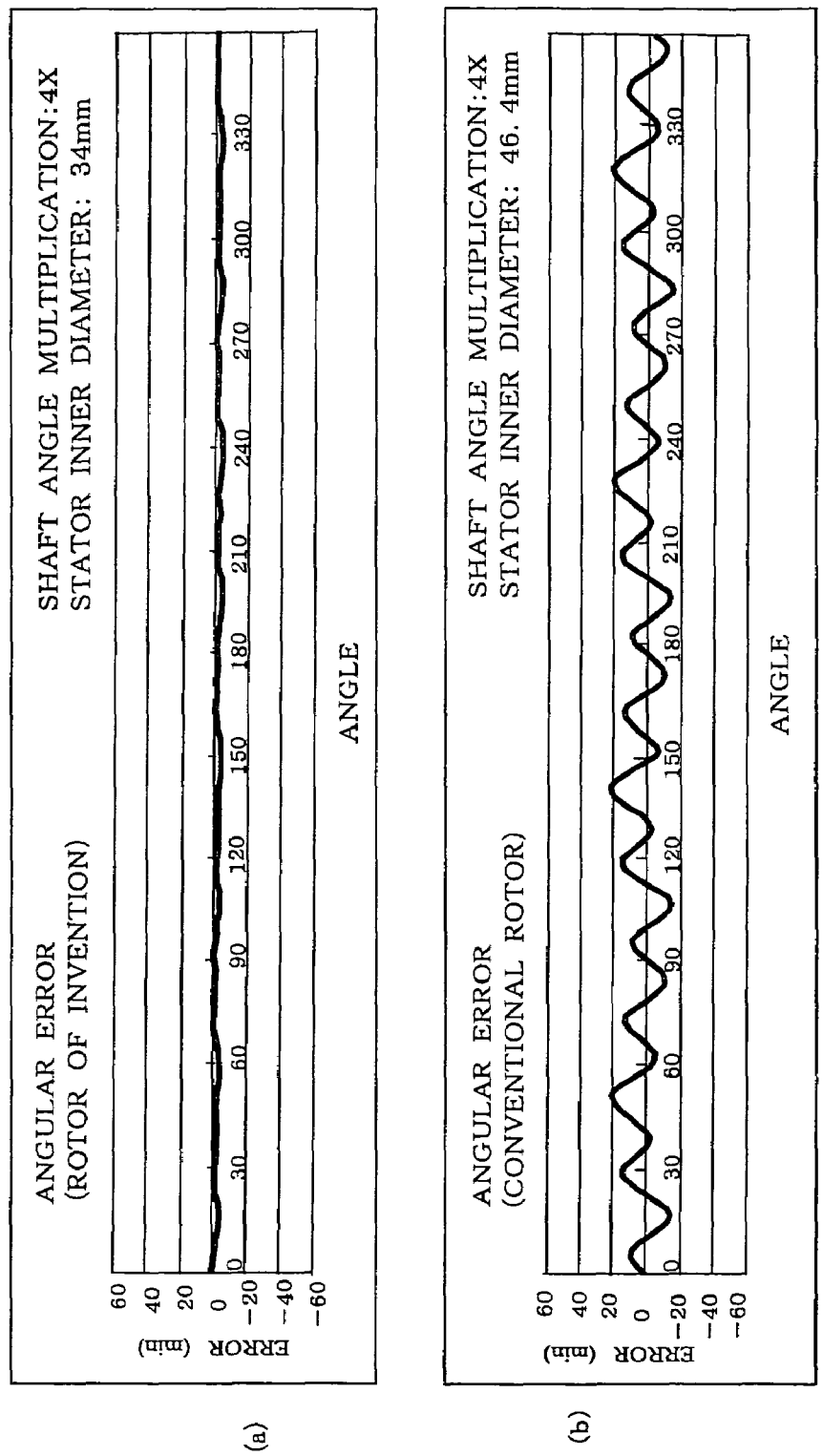
FIGS. 2A and 2B are graphs of the measured angular error for an example of the present invention and a conventional VR resolver, respectively, each with a shaft angle multiplier of 4×.

As can be seen from Table 1 and FIG. 2, the present invention markedly improves the gap permeance properties compared to the conventional example.

The present invention was described above with respect to an embodiment of a VR resolver having 4 salient poles (a shaft angle multiplier of 4×), but the method described above for selecting the shape of a rotor can be applied to a VR resolver having 2 or more poles (a shaft angle multiplier of 2× or higher). In addition, the present invention can be applied to a VR resolver with 2 or more poles with the same results.

The above-described technical concept of selecting a rotor shape so that the gap permeance varies in accordance with a sine function of the rotational angle can also be applied to a VR angle sensor or a synchro.

Obviously, numerous modifications and variations of the present invention are possible in light of the above teachings. It is therefore to be understood that within the scope of the appended claims, the present invention may be practiced otherwise than as specifically described herein.

What is claimed is:

1. A variable reluctance resolver wherein angular position is determined by detection of permeance between a rotor pole and a stator pole, the resolver comprising:

a rotor and a stator wherein the rotor includes a noncircular core of magnetic material which is rotatably supported inside the stator with a magnetic gap therebetween, said noncircular core including a central circular portion having a circular inner periphery, and a plurality of salient poles protruding from the central circular portion, wherein each salient pole of the rotor has a center which is offset by a prescribed offset distance in the radial direction from the center of the rotor, and the outer peripheral shape of each salient pole comprises an arc of a circle of radius r which is centered on the center of the salient pole and which does not extend to the inner peripheral surface of the stator, wherein a shape of said rotor is such that a permeance of the magnetic gap varies according to a sine function for the rotational angle and said offset distance.

2. A variable reluctance resolver as claimed in claim 1 wherein the shape of the rotor is defined in accordance with the rotational angle, which is expressed by the mechanical angle $\phi$ or the electrical angle $\theta$ corrected by the shaft angle multiplier, and the offset distance A such that the outer radius $R_r$ of the rotor has a value given by the following equation:

$$Rr = A\cos\phi + \sqrt{r^2 - A^2\sin^2\phi} = A\cos(\theta/N) + \sqrt{r^2 - A^2\sin^2(\theta/N)}$$

wherein r is the radius of each salient pole, A is the offset distance, $\phi$ is the mechanical angle ($\phi$=electrical angle $\theta$/shaft angle multiplier N), $\theta$ is the electrical angle, and N is the shaft angle multiplier.

3. A variable reluctance resolver as claimed in claim 2 wherein the rotor includes at least four abutting salient poles protruding from and evenly spaced around the periphery of the central circular portion.

4. A variable reluctance resolver as claimed in claim 1 wherein the shape of the rotor is defined in accordance with the rotational angle, which is expressed by the mechanical angle $\phi$ or the electrical angle $\theta$ corrected by the shaft angle multiplier, such that the gap $\delta$ between the stator and the rotor has a value given by the following equation:

$$\delta = R_s - A\cos\phi + \sqrt{r^2 - A^2\sin^2\phi} = R_s - A\cos(\theta/N) + \sqrt{r^2 - A^2\sin^2(\theta/N)}$$

wherein $\delta$ is the gap, $R_s$ is the inner radius of the stator, A is the offset distance, $\phi$ is the mechanical angle ($\phi$=electrical angle $\theta$/shaft angle multiplier N), $\theta$ is the electrical angle, N is the shaft angle multiplier, and r is the radius of each salient pole.

5. A variable reluctance resolver as claimed in claim 3 wherein the rotor includes at least four abutting salient poles protruding from and evenly spaced around the periphery of the central circular portion.

* * * * *

UNITED STATES PATENT AND TRADEMARK OFFICE
CERTIFICATE OF CORRECTION

PATENT NO. : 7,030,532 B2
APPLICATION NO. : 10/821910
DATED : April 18, 2006
INVENTOR(S) : Kobayashi et al.

It is certified that error appears in the above-identified patent and that said Letters Patent is hereby corrected as shown below:

Column 8 lines 3-6, the formula:

$$\text{``}Rr = \frac{A\cos\phi + \sqrt{r^2 - A^2\sin^2\phi}}{\sqrt{r^2 - A^2\sin^2(\theta/N)}} = A\cos(\theta/N) + \text{''}$$

Should read:

$$--Rr = A\cos\phi + \sqrt{r^2 - A^2\sin^2\phi} = A\cos(\theta/N) + \sqrt{r^2 - A^2\sin^2(\theta/N)} --$$

Column 8, lines 21-23, the formula:

$$\text{``}\delta = \frac{R_s - A\cos\phi + \sqrt{r^2 - A^2\sin^2\phi}}{\sqrt{r^2 - A^2\sin^2(\theta/N)}} = R_s - A\cos(\theta/N) + \text{''}$$

Should read:

$$--\delta = R_s - A\cos\phi + \sqrt{r^2 - A^2\sin^2\phi} = R_s - A\cos(\theta/N) + \sqrt{r^2 - A^2\sin^2(\theta/N)} --$$

Column 8, line 29 (claim 5, line 1), "3" should reads -- 4 --.

Signed and Sealed this

Twenty-eighth Day of November, 2006

JON W. DUDAS
*Director of the United States Patent and Trademark Office*